July 27, 1937.  P. BERTRAND  2,088,284
DEVICE FOR CONVEYING ARTICLES IN CONTINUOUS FURNACES
Filed Oct. 14, 1936  5 Sheets-Sheet 1

Inventor
Pierre Bertrand
by Dorsey & Cole
Attorneys

July 27, 1937.  P. BERTRAND  2,088,284
DEVICE FOR CONVEYING ARTICLES IN CONTINUOUS FURNACES
Filed Oct. 14, 1936  5 Sheets-Sheet 4
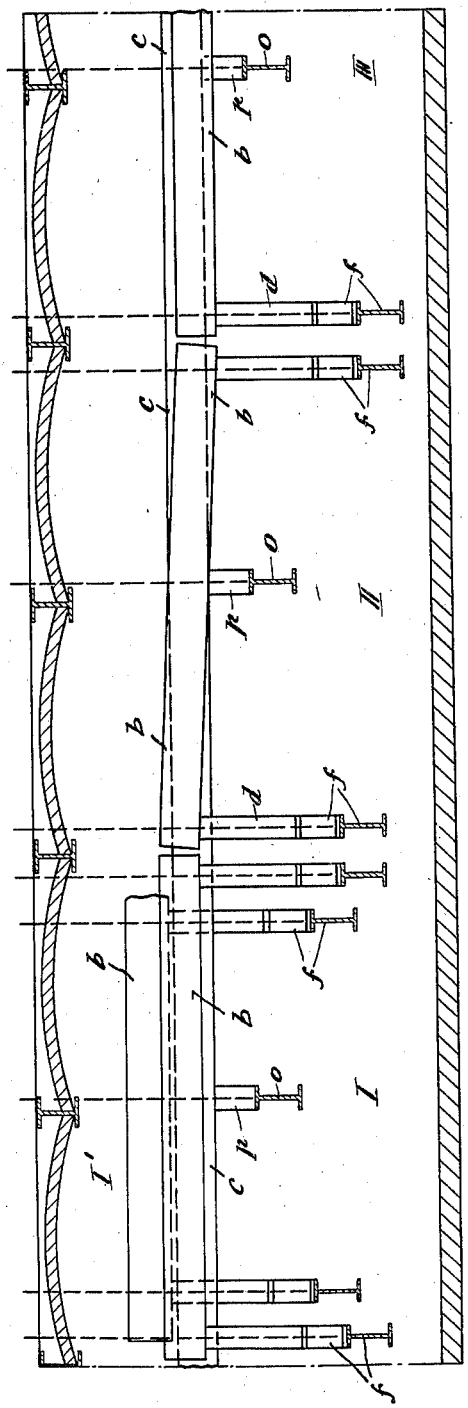

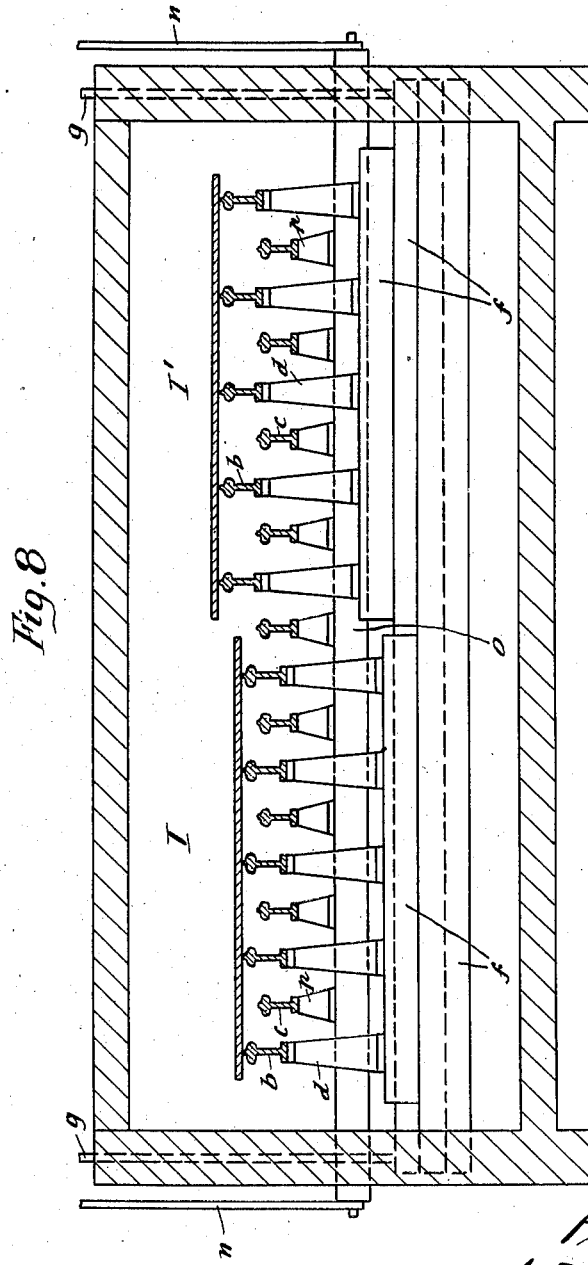

Patented July 27, 1937

2,088,284

UNITED STATES PATENT OFFICE 2,088,284

DEVICE FOR CONVEYING ARTICLES IN CONTINUOUS FURNACES

Pierre Bertrand, Paris, France, assignor to Naamlooze Vennootschap Maatschappij tot Beheer en Exploitatie van Octrooien, The Hague, Netherlands Application October 14, 1936, Serial No. 105,621
In Germany November 1, 1935

6 Claims. (Cl. 198—219)

This invention relates to conveying devices for continuously operating furnaces, such as annealing furnaces for glass articles, and it has more particularly reference to conveyors of the type consisting of a plurality of longitudinal bars extending parallelly of the direction of feed of the objects, with the bars divided into a group of horizontally spaced fixed bars and a group of bars adapted to be moved on endless paths in vertical planes between the bars of the first-mentioned group. With these devices the progression of the articles through the furnace takes place intermittently, inasmuch as the movable bars during their forward stroke are above the plane of the fixed bars so that they support and carry the objects along with them, while during their return stroke they are below the said plane so that the objects are deposited on the fixed bars and remain resting thereon.

Furnaces of the kind stated are already well-known in which the objects can be moved at different speeds by proper adjustments of the movable bars, such as by a change in the connection of the bars with their drive or by an alteration of the position of the movable bars relative to the cross beams carrying them. These adjustments make it necessary to stop the entire conveying device, thereby entailing an interruption of the working of the furnace.

It is the object of the invention to provide a conveying device with alternate fixed and movable bars, by means of which the feeding speed can be varied in a simple way and within vast limits without stopping the conveyor or interrupting the furnace operation.

For attaining this object, the invention primarily consists in providing means for moving the movable bars on endless paths the ascending portion of which is not parallel with the descending portion and for allowing vertical adjustment of the fixed bars.

Another object is to subdivide the conveyor platform longitudinally and/or transversely of the furnace into several sections and to regulate the feeding speed for the articles individually on each of these sections, this being attained by making the fixed bars of one section vertically adjustable independently from the fixed bars of the other sections. This arrangement allows to convey the objects at speeds which, during the same period of time, are at one point of the conveyor different from those at another point and may have any desired values, so that it is possible to subject objects which are simultaneously treated in the furnace to different annealing speeds also in case only one range of temperature is obtained in the furnace.

Still another object of the invention consists in constituting the conveyor in such a manner as to allow a difference of speed to be attained for the articles even within one and the same section between the entrance and exit end thereof, causing the speed to gradually increase or decrease for example from one end of the section to the other, such as in a manner that the speeds at the ends of a predetermined section correspond to the speed of the preceding and the succeeding section, respectively. This is accomplished by setting the ends of the fixed bars in the respective section at different heights or levels.

In order to allow of the invention to be more clearly understood it will now be described with reference to the accompanying drawings in which.

Figure 3:
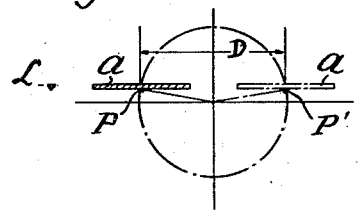
Figure 3A:
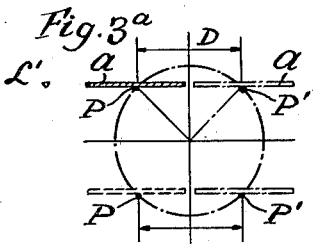

Figs. 3 and 3a diagrammatically illustrate the change of the feeding speed by vertical adjustment of the fixed bars of a conveyor the movable bars of which travel on an endless circular path.

Figure 4:
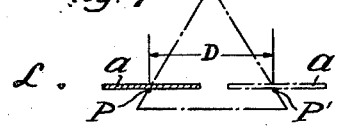
Figure 4A:
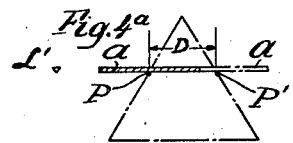

Figs. 4 and 4a are corresponding illustrations of the change in speed of a conveyor the movable bars of which travel on a triangular path with upwardly turned summit.

Figure 5:
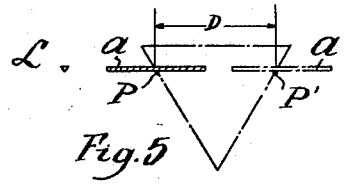
Figure 5A:
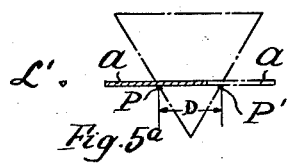

Figs. 5 and 5a are similar illustrations of the change in speed of a conveyor the movable bars of which travel on a triangular path with downwardly turned summit.

Figure 6:
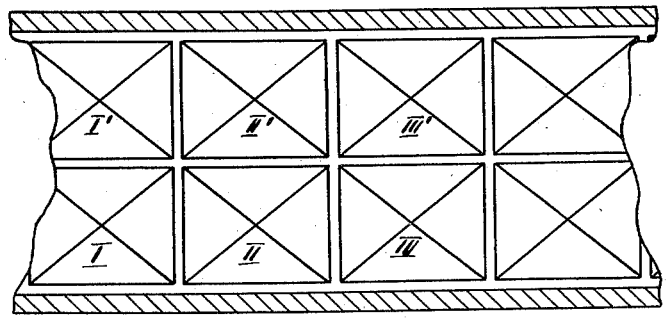

Fig. 6 is a diagrammatic plan of a furnace with a conveyor divided into a plurality of independent sections.

Fig. 7 is a vertical longitudinal section of a furnace according to Fig. 6, and

Fig. 8 is a vertical cross section of this furnace.

The conveying device of the furnace A comprises a group of parallel fixed bars $b$ and a group of movable bars $c$ arranged between the former. The bars $b$ are supported by means of standards $d$ on cross beams $f$ the ends of which project into recesses of the side walls of the furnace where they are attached to vertical screw spindles $g$. These spindles are guided in nuts $h$ which are mounted on the top of the side walls and formed as worm wheels engaged and adapted to be rotated by worms $k$ carried by longitudinally extending shafts $i$. When rotating the shafts $i$ either by hand or mechanically in one direction or the other, the cross beams $f$ are raised or lowered whereby the level of the fixed bars in the furnace is varied. For effecting this vertical adjustment there may also be used any suitable means other than those shown.

In the embodiment illustrated, movement is imparted to the bars $c$ by means of crank drives $m$ which are connected by rods $n$ with the ends of cross beams $o$ projecting through slots of the side walls of the furnace, these beams carrying the movable bars $c$ through the intermediary of standards $p$. The cranks $m$ are mounted on transverse shafts $r$ to which rotation is imparted through worm gearings $s$ from shafts $t$ extending longitudinally of the furnace.

Figure 1:
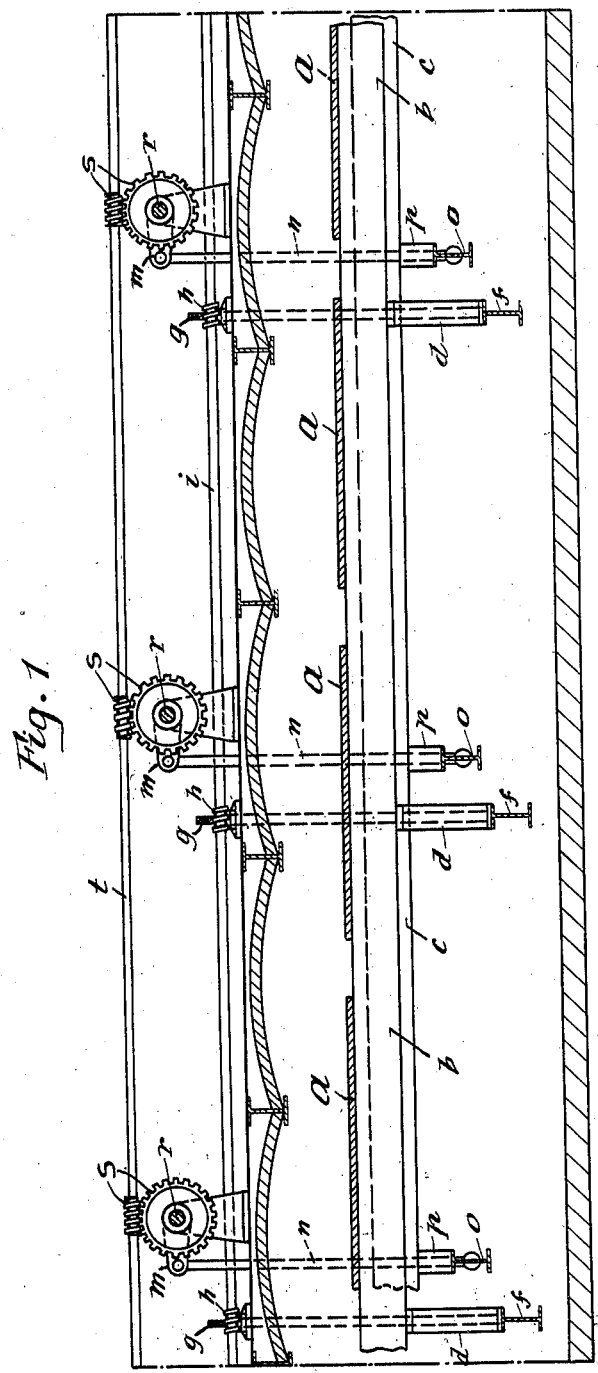
Fig. 1 is a longitudinal section of a portion of a glass sheet annealing furnace with an embodiment of a conveyor according to the invention.
Figure 2:
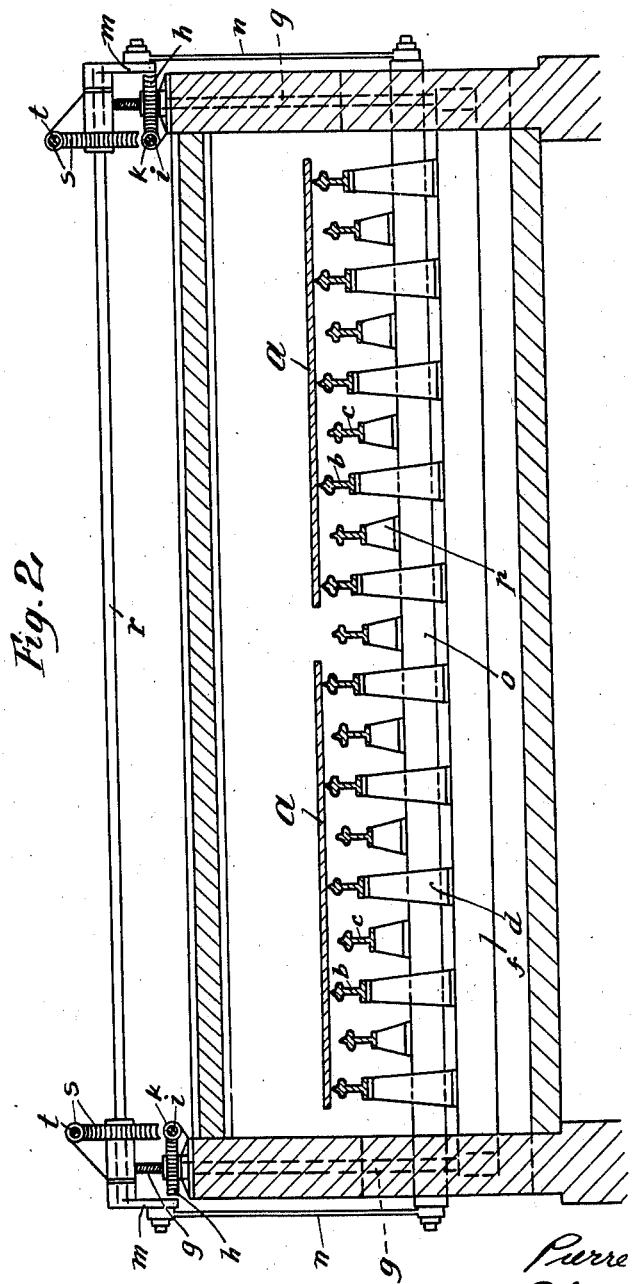
Fig. 2 is a cross-section of the furnace.

In actuating the movable bars $c$ by means of crank drives $m$, as shown in Figs. 1 and 2, each point of a bar $c$ is caused to move on a circular path in accordance with the circular movement of the crank pins. That portion of the circular path which lies above the upper surface of the fixed bars $b$ is determinative for the feed or advance movement of the articles, the length of the advance stroke corresponding to the length of the chord of the segment severed from the circular path by the top plane of the bars $b$. If, as assumed in Fig. 3, the top plane of the fixed bars $b$ is at the level L, a point P of the article $a$ to be conveyed through the furnace will be advanced by the distance D from P to P' at each cycle of movement of the movable bars $c$. When the bars $b$ are adjusted at a higher level such as L' in Fig. 3a, the distance D will become correspondingly shorter, which means that the rate of progression is decreased. If the vertical displacement of the fixed bars $c$ takes place within the upper half of the circular path and the circular movement of these bars is a uniform one, the articles in the case of reduced feeding speed will rest longer on the fixed than on the movable bars. If the vertical displacement of the fixed bars is effected within the lower half of the circular path, the speed decreases the more, the lower the fixed bars $b$ are set, as will be understood from the lower part of Fig. 3a. In this case, the articles will rest the longer on the movable bars the more the feeding speed is reduced. In each case, however, the fixed and movable bars constantly alternate in supporting the articles under treatment.

If the movement of the bars $c$ is accomplished by separate shifting and lifting means, the path of travel of the bars may acquire the form of a triangle. The moment of the up and down movement of the bars during the period of their horizontal to and fro movement determines whether the resulting triangle of movement has its summit turned upwardly as shown in Figs. 4 and 4a, or downwardly as shown in Figs. 5 and 5a. In the former case (Figs. 4, 4a) the feeding speed is decreased when the level L of the fixed bars is raised. In the latter case (Figs. 5, 5a) the speed decreases when the level L is lowered.

Generally speaking, there may be chosen for the movement of the bars $c$ all paths the ascending and descending portions of which do not extend in parallelism.

Figs. 6 to 8 illustrate an example of sub-division of the furnace into independent zones, the conveyor platform being divided into two sections widthwise and a greater number of sections lengthwise.

In each of the sections I, II, III . . . and I', II', III' . . . the fixed bars are adjustable independently from the bars of the other sections. According to Fig. 7, the bars $b$ of section I are at a higher level than the bars $b$ of the section III. The bars $b$ of the intermediate section II are positioned at such an incline that they lie with one end on the level of section I and with the other end on that of section III. When it is assumed that the articles move more rapidly on section III than on I, the illustrated position of the bars of section II causes the articles to move thereon with a gradually increasing speed beginning with the speed of section I and terminating with that of III. Moreover, the fixed bars $b$ of section I' are set at a higher level than the fixed bars $b$ of the neighbouring section I. As a result thereof, different conveying speeds are attained on the two sections situated widthwise beside each other.

Having thus described my invention, what I claim as new and desire to secure by Letters-Patent is:—

1. A device for conveying articles in continuous furnaces, comprising a group of horizontally spaced fixed bars extending parallelly in the longitudinal direction of the furnace, another group of similar bars arranged in the spaces between the first-said bars, means for imparting to the last-said group of bars a movement in vertical planes crossing the horizontal plane of the fixed bars on endless paths the ascending portion of which is not parallel with their descending portion, and means for varying the level assumed by the fixed bars in the furnace and thereby vary the rate of progression of the articles through the furnace.

2. In a continuous furnace for the thermal treatment of articles, groups of longitudinally extending horizontally spaced fixed bars occupying successive sections of the furnace of predetermined lengths, another group of similar bars arranged longitudinally of the furnace between the bars of the first-said groups, means for imparting to the last-said group of bars a movement in vertical planes crossing the horizontal planes of the fixed bars on endless paths the ascending portion of which is not parallel with their descending portion, and means associated with each section for vertically adjusting the fixed bars of each of these sections independently from the fixed bars of the other sections.

3. In a continuous furnace for the thermal treatment of articles, groups of longitudinally extending horizontally spaced fixed bars occupying separate furnace sections lying one beside the other widthwise of the furnace, another group of similar bars arranged longitudinally of the furnace between the bars of the first-said groups, means for imparting to the last-said group of bars a movement in vertical planes crossing the horizontal planes of the fixed bars on endless paths the ascending portion of which is not parallel with their descending portion, and means associated with each section for vertically adjusting the fixed bars of each of these sections independently from the fixed bars of the other sections.

4. In a continuous furnace for the thermal treatment of articles, groups of longitudinally extending horizontally spaced fixed bars occupying separate furnace sections lying beside one another lengthwise and widthwise of the furnace, another group of similar bars arranged longitudinally of the furnace between the bars of the first-said groups, means for imparting to the last-said group of bars a movement in vertical planes crossing the horizontal planes of the fixed bars on endless paths the ascending portion of which is not parallel with their descending portion, and means associated with each section for vertically adjusting the fixed bars of each of these sections independently from the fixed bars of the other sections.

5. In a continuous furnace for the thermal treatment of articles, groups of longitudinally extending horizontally spaced fixed bars occupying separate furnace sections formed in successive arrangement lengthwise of the furnace, another group of similar bars arranged longitudinally of the furnace between the bars of the first-said groups, means for imparting to the last-said group of bars a movement in vertical planes crossing the horizontal planes of the fixed bars on endless paths the ascending portion of which is not parallel with their descending portion, and means associated with each section for vertically adjusting the fixed bars of each of these sections independently from the fixed bars of the other sections, these adjusting means being of a construction to allow the fixed bars of any particular section to be positioned so that their ends assume different levels.

6. In a continuous furnace for the thermal treatment of articles, groups of longitudinally extending horizontally spaced fixed bars occupying separate furnace sections lying beside one another lengthwise and widthwise of the furnace, another group of similar bars arranged longitudinally of the furnace between the bars of the first-said groups, means for imparting to the last-said group of bars a movement in vertical planes crossing the horizontal planes of the fixed bars on endless paths the ascending portion of which is not parallel with their descending portion, and means associated with each section for vertically adjusting the fixed bars of each of these sections independently from the fixed bars of the other sections, these adjusting means being of a construction to allow the fixed bars of any particular section to be positioned so that their ends assume different levels.

PIERRE BERTRAND.